(12) United States Patent
Swinderman et al.

(10) Patent No.: US 6,575,294 B1
(45) Date of Patent: Jun. 10, 2003

(54) CONVEYOR BELT SKIRT ASSEMBLY

(75) Inventors: R. Todd Swinderman, Kewanee, IL (US); Gary D. Swearingen, Kewanee, IL (US); Steven E. Brody, Kewanee, IL (US)

(73) Assignee: Martin Engineering Company, Neponset, IL (US)

( * ) Notice: Subject to any disclaimer, the term of this patent is extended or adjusted under 35 U.S.C. 154(b) by 0 days.

(21) Appl. No.: 10/193,745

(22) Filed: Jul. 11, 2002

(51) Int. Cl.[7] ............................................... B65G 21/20
(52) U.S. Cl. .............................. 198/836.1; 198/836.2; 198/836.3; 198/836.4
(58) Field of Search .......................... 198/836.1, 836.2, 198/836.3, 836.4

(56) References Cited

U.S. PATENT DOCUMENTS

| | | | |
|---|---|---|---|
| 2,681,134 A | | 6/1954 | White |
| 3,344,909 A | | 10/1967 | Clegg |
| 3,499,523 A | | 3/1970 | Hansen et al. |
| 4,204,595 A | * | 5/1980 | Marrs ........................ 198/836 |
| 4,231,471 A | * | 11/1980 | Gordon ...................... 198/836 |
| 4,436,446 A | * | 3/1984 | Gordon ...................... 198/861 |
| 4,641,745 A | * | 2/1987 | Skates ........................ 198/836 |
| 4,678,086 A | | 7/1987 | Nervig et al. |
| 4,874,082 A | | 10/1989 | Swinderman |
| 5,016,747 A | | 5/1991 | Veenhof |
| 5,048,669 A | * | 9/1991 | Swinderman ............ 198/836.1 |
| 5,154,280 A | | 10/1992 | Mott |
| 5,267,642 A | * | 12/1993 | Gharpurey et al. ...... 198/836.1 |
| 5,303,813 A | * | 4/1994 | De Rooy ................. 198/836.1 |
| 5,513,743 A | | 5/1996 | Brink |
| 5,913,404 A | * | 6/1999 | Bowman ................. 198/836.1 |
| 6,269,943 B1 | * | 8/2001 | Mott .......................... 198/823 |
| 6,328,156 B1 | | 12/2001 | Ostman |

* cited by examiner

Primary Examiner—Douglas Hess
(74) Attorney, Agent, or Firm—Barnes & Thornburg

(57) ABSTRACT

A conveyor belt skirt assembly adapted to be attached to a conveyor mechanism to retain conveyed material on a conveyor belt. The conveyor belt skirt assembly includes a mounting mechanism having first and second clamping members and a conveyor belt skirt adapted to be attached between the first and second clamping members. The conveyor belt skirt includes a relatively thin upper portion and a relatively thick lower portion. The upper portion of the skirt includes an offset wall forming a pocket adapted to receive the first clamping member.

24 Claims, 3 Drawing Sheets

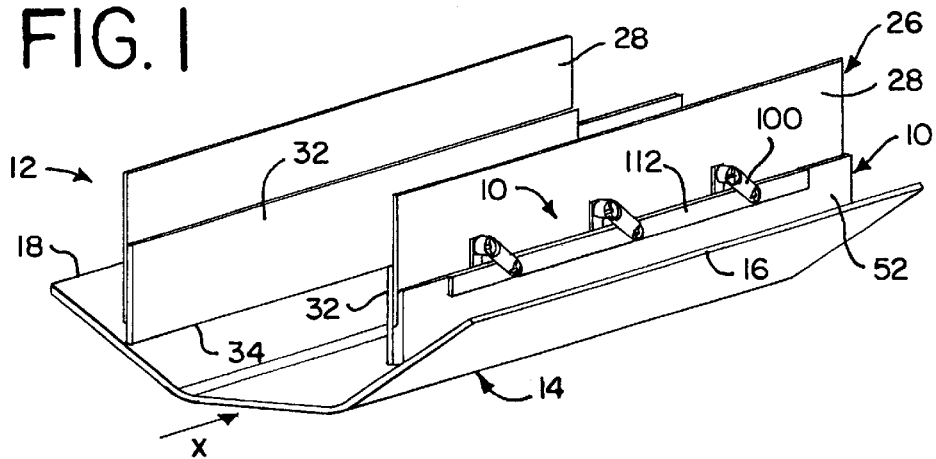
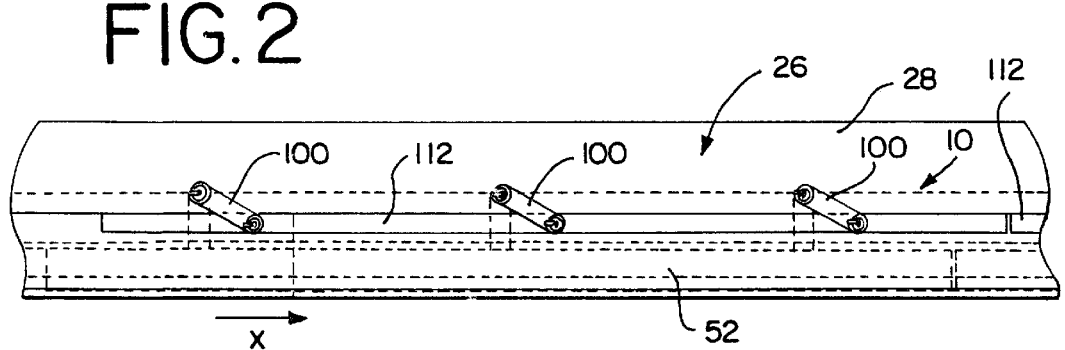
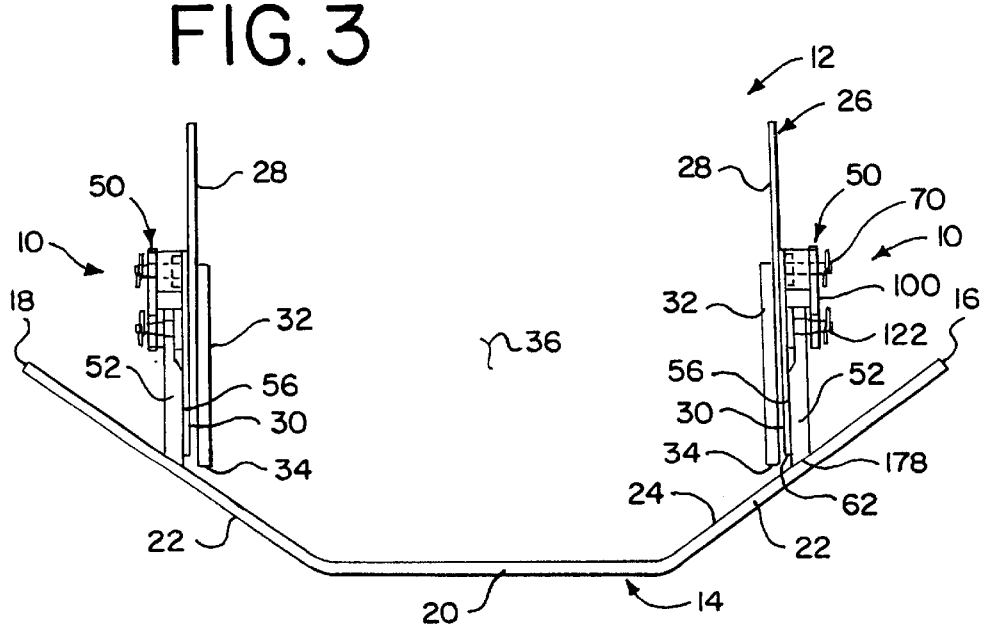

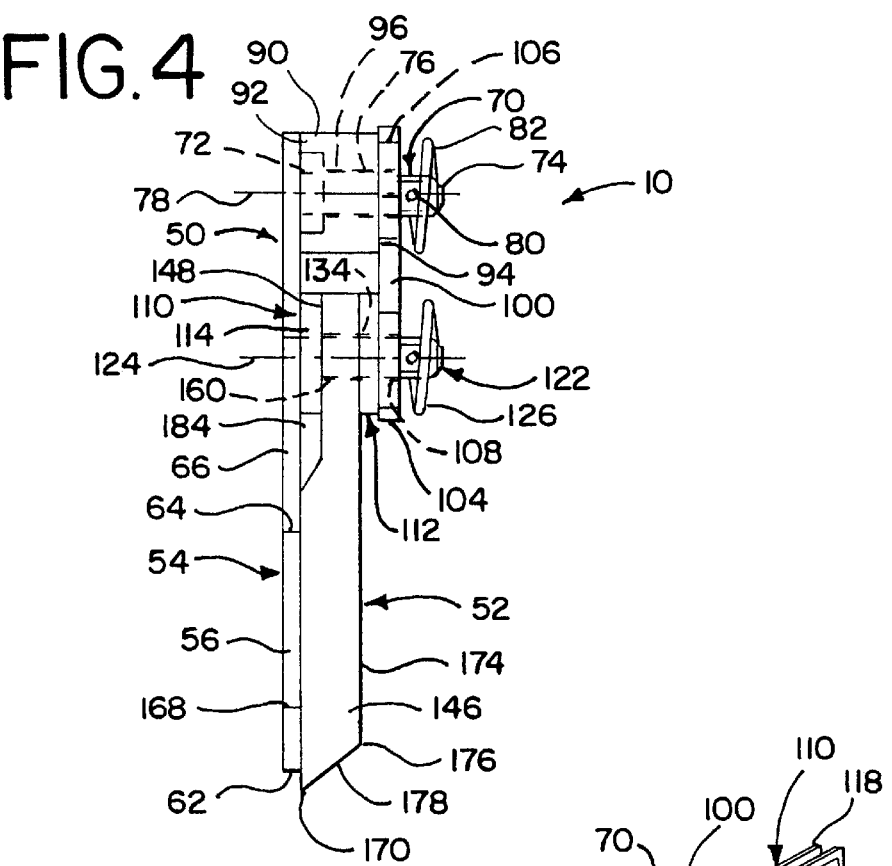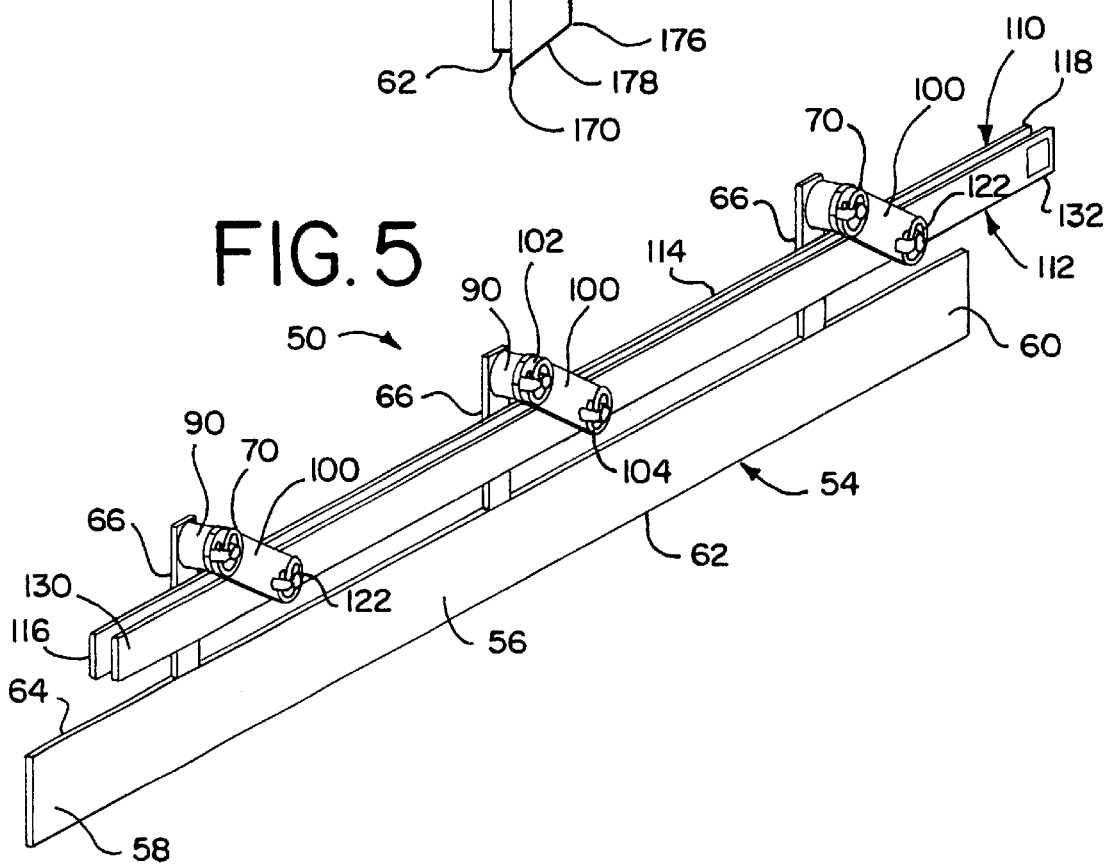

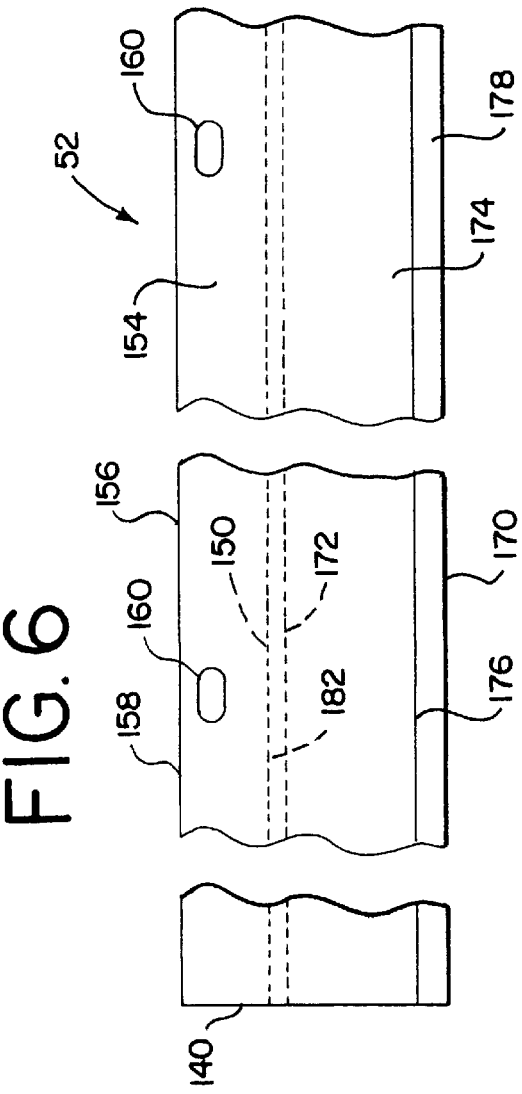

CONVEYOR BELT SKIRT ASSEMBLY

BACKGROUND OF THE INVENTION

The present invention is directed to a conveyor belt skirt assembly adapted to be attached to a conveyor mechanism to retain bulk material on a moving conveyor belt, and in particular to a conveyor belt skirt assembly including a skirt member having a relatively thick lower portion adapted to engage the conveyor belt and a relatively thin upper portion forming a pocket adapted to receive a mounting member for attachment to the conveyor mechanism.

Conveyor mechanisms having a moving conveyor belt are utilized to transport bulk material, such as coal, cement, aggregate, grain and the like, from a first location to a second location. As bulk material is loaded onto the moving conveyor belt in a load zone of the conveyor mechanism, a portion of the bulk material often spills over the side edges of the conveyor belt. Conveyor belts are frequently configured as a trough such that the side portions of the conveyor belt are inclined outwardly and upwardly from the longitudinal center line of the conveyor belt to prevent the spillage of conveyed material over the side edges of the conveyor belt. Troughing of the conveyor belt, however, does not eliminate the spillage of conveyed material. Conveyor belt skirts such as disclosed in U.S. Pat. No. 5,016,747 of Martin Engineering Company have been placed along each side edge of the conveyor belt in the load zone of the conveyor mechanism to retain bulk material on the conveyor belt and to prevent spillage of the conveyed material over the side edges of the conveyor belt.

SUMMARY OF THE INVENTION

A conveyor belt skirt assembly adapted to be attached to a side wall of a conveyor mechanism to retain conveyed material on a conveyor belt of the conveyor mechanism. The conveyor belt skirt assembly includes a mounting mechanism and a conveyor belt skirt. The mounting mechanism includes a first clamping member having an elongate mounting strip. The mounting strip includes an inside surface and an outside surface. The first clamping member includes one or more connector members such as fasteners attached to the outside surface of the mounting strip. The mounting mechanism also includes a second clamping member adapted to be attached to the conveyor mechanism. The second clamping member includes one or more apertures, wherein each aperture is adapted to receive a respective fastener of the first clamping member. The mounting mechanism also includes a mounting member including an elongate strip member having a bottom edge adapted to be located above the conveyor belt. The mounting strip of the first clamping member is adapted to be attached to the strip member of the mounting member.

The conveyor belt skirt includes an upper portion having a generally planar first inner wall and a generally planar first outer wall. The first outer wall is located generally parallel to and opposite the first inner wall. The skirt also includes a lower portion attached to the bottom end of the upper portion. The lower portion includes a generally planar second inner wall and a generally planar second outer wall. The second outer wall is located generally parallel to and opposite the second inner wall. The first outer wall of the upper portion is generally coplanar with the second outer wall of the lower portion, and the first inner wall of the upper portion is generally parallel to and offset inwardly from the inner wall of the lower portion. The lower portion of the skirt is generally thicker than the upper portion of the skirt to provide increased resistance to bending of the lower portion of the skirt when the skirt is retaining conveyed material on the conveyor mechanism. The offset first inner wall of the upper portion forms a pocket adapted to receive the mounting strip of the first clamping member. The upper portion of the skirt includes one or more connector members such as apertures. The fasteners of the first clamping member extend through apertures in the upper portion of the skirt. The skirt is attached to and between the first and second clamping members.

BRIEF DESCRIPTION OF THE DRAWING FIGURES

FIG. 1 is a perspective view of a conveyor mechanism including the conveyor belt skirt assembly of the present invention.

FIG. 2 is a side elevational view of the conveyor mechanism and of the conveyor belt skirt assembly with the conveyor belt removed from view for purposes of clarity.

FIG. 3 is a cross sectional view of the conveyor mechanism of FIG. 1 with a conveyor belt skirt assembly located at each side of the conveyor belt.

FIG. 4 is an end view of the conveyor belt skirt assembly.

FIG. 5 is a perspective view of the mounting mechanism of the conveyor belt skirt assembly.

FIG. 6 is a side elevational view of the conveyor belt skirt of the conveyor belt skirt assembly.

FIG. 7 is an end view of the conveyor belt skirt.

DETAILED DESCRIPTION OF THE PREFERRED EMBODIMENT

As shown in FIGS. 1–3, two conveyor belt skirt assemblies 10 are attached to a conveyor mechanism 12. As best shown in FIG. 3, the conveyor mechanism 12 includes a movable conveyor belt 14 having a first edge 16 and a second edge 18. The conveyor belt 14 includes a center portion 20 and inclined side portions 22 that respectively extend between the center portion 20 and the side edges 16 and 18. The conveyor belt 14 includes a top surface 24. The conveyor belt 14 is generally made at least in part from elastomeric materials.

The conveyor mechanism 12 also includes a conveyor chute 26. The chute 26 includes a pair of generally vertical side walls 28 that are spaced apart from one another and that are generally parallel to one another. Each side wall 28 includes a bottom edge 30 that is located above and spaced apart from the top surface 24 of the conveyor belt 14. The conveyor mechanism 12 may include a wear liner 32 that is attached to the interior surface of the side walls 28. Each wear liner 32 includes a bottom edge 34 that is located above and spaced apart from the top surface 24 of the belt 14. A load zone 36 is formed within the chute 26 between the side walls 28 and above the conveyor belt 14 in which material to be conveyed is loaded onto the conveyor belt 14. The side walls 28 and wear liners 32 are generally made of metal and are therefore spaced apart from the conveyor belt 14 to avoid damaging the conveyor belt 14. The gap between the bottom edge 34 of the wear liner 32 and the belt 14, and the gap between the bottom edge 30 of the side wall 28 and the belt 14, allow conveyed material to pass therethrough to the outside of the load zone 36 and to the exterior of the chute 26 such that the conveyed material can spill over the first and second edges 16 and 18 of the belt 14.

As best shown in FIG. 3, a respective conveyor belt skirt assembly 10 is attached to the outside surface of each side wall 28 of the chute 26. The chute 26 and the side walls 28 are mounting members for each of the conveyor belt skirt assemblies 10. As best shown in FIGS. 4 and 5, the conveyor belt skirt assembly 10 includes a mounting mechanism 50 and a conveyor belt skirt 52. The mounting mechanism 50 includes a mounting member 54 having an elongate strip member 56 that extends between a first end 58 and a second end 60. The strip member 56 is generally plate-like and includes a generally linear bottom edge 62 and a generally linear top edge 64 that is spaced apart from and generally parallel to the bottom edge 62. The mounting member 54 also includes one or more struts 66 that extend upwardly from the top edge 64 of the strip member 56 generally perpendicular and coplanar to the strip member 56. The struts 66 are spaced apart and generally parallel to one another. The mounting member 54 preferably includes two or more struts 66.

A fastener 70, such as a lynch pin, is respectively attached to the top end of each strut 66. Each fastener 70 has a first end 72 attached to the exterior surface of the strut 66 and a second end 74. Each fastener 70 includes a generally cylindrical shaft 76 having a linear central axis 78 that is generally perpendicular to the strut 66. The second end 74 of the fastener 70 includes a bore 80 that extends diametrically through the shaft 76 generally perpendicular to the axis 78. A retainer member 82, such as a retainer ring or cotter pin, is adapted to be inserted through the bore 80 of the fastener 70 such that the retainer member 82 is removably attached to the fastener 70.

A generally cylindrical spacer member 90 is located on each fastener 70. The spacer member 90 includes a first end 92, a second end 94, and a bore 96 that extends from the first end 92 to the second end 94. The bore 96 includes a first portion that is generally cylindrical and that has a diameter slightly larger than the diameter of the shaft 76 of the fastener 70. The bore 96 also includes a second portion that is generally cylindrical and that has a diameter that is larger than the diameter of the first portion of the bore 96. The enlarged-diameter second portion of the bore 96 is adapted to accommodate and receive a weld that attaches the first end 72 of the fastener 70 to the mounting member 54. The first and second ends 92 and 94 of the spacer member 90 have annular walls that are generally planar and parallel to one another. The spacer member 90 may be made from nylon or other low-friction materials. If desired, the fasteners 70 can be attached directly to the side wall 28 of the chute 26 without the use of the mounting member 54.

An arm 100 is respectively pivotally attached to each fastener 70 and is thereby pivotally attached to the mounting member 54. Each arm 100 is generally plate-like and extends from a first end 102 to a second end 104. The first end 102 of the arm 100 includes a circular aperture 106 through which the shaft 76 of the fastener 70 extends. The second end 104 of the arm 100 includes a circular aperture 108. The arm 100 is adapted to abut against the second end 94 of the spacer member 90 and is removably retained on the fastener 70 by the retainer member 82. The arm 100 is pivotal about the central axis 78 with respect to the fastener 70. The spacer member 90 spaces the arm 100 apart from the mounting member 54.

The mounting mechanism 50 also includes a first clamping member 110 and a second clamping member 112. The first clamping member 110 includes a mounting or clamping strip 114 that is generally plate-like and that extends between a first end 116 and a second end 118. The mounting strip 114 has a generally planar interior surface and a generally planar exterior surface. One or more connector members such as fasteners 122 are attached to the outer surface of the mounting strip 114. The fasteners 122 may be lynch pins. The fasteners 122 are constructed in the same manner as the fasteners 70 and include a generally cylindrical shank and a diametrical bore. Each fastener 122 includes a linear central axis 124. A retainer member 126, such as a retainer ring or cotter pin, extends through the bore in the outer end of the fastener 122 and is removably attached thereto. The fasteners 122 are spaced apart from one another along the mounting strip 114 at the same interval as the fasteners 70 are spaced apart from one another along the mounting member 54. The axes 78 of the fasteners 70 are generally parallel to the axes 124 of the fasteners 122.

The second clamping member 112 comprises a generally plate-like mounting or clamping strip having a generally planar interior surface and a generally planar exterior surface. The second clamping member 112 extends between a first end 130 and a second end 132. The second clamping member 112 is generally approximately the same size and shape as the mounting strip 114 of the first clamping member 110. The second clamping member 112 includes a plurality of circular apertures 134 that are spaced apart from one another at the same interval as the fasteners 122 of the first clamping member 110 are spaced apart from one another. Each fastener 122 of the first clamping member 110 is adapted to extend through a respective aperture 134 in the second clamping member 112. The fasteners 122 of the first clamping member 110 are also adapted to extend through a respective aperture 108 of an arm 100 such that each arm 100 is pivotally attached to the first and second clamping members 110 and 112. Each arm 100 is selectively pivotal about the axis 124 with respect to the first and second clamping members 110 and 112. The first and second clamping members 110 and 112 are pivotally attached to the mounting member 54 by the arms 100.

The conveyor belt skirt 52, as best shown in FIGS. 6 and 7, is elongate and extends between a first end 140 and a second end 142. The skirt 52 includes an upper portion 144 and a lower portion 146 that is attached to the upper portion 144. The upper portion 144 is an attachment portion adapted to attach the skirt 52 to the mounting mechanism 50. The lower portion 146 is a sacrificial wear portion that is adapted to engage the conveyor belt 14. The upper portion 144 of the skirt 52 is generally plate-like in shape and includes a generally planar inner wall 148 that extends from a generally linear bottom edge 150 to a generally linear top edge 152 that is generally parallel to the bottom edge 150. The upper portion 144 also includes a generally planar outer wall 154 that is spaced apart from, generally parallel to, and opposite the inner wall 148. The outer wall 154 includes a generally linear top edge 156 that is generally parallel to the top edge 152 of the inner wall 148. A generally planar top wall 158 extends between the top edges 152 and 156. The upper portion 144 of the skirt 52 includes one or more connector members such as apertures 160 that extend through the upper portion 144 from the inner wall 148 to the outer wall 154. The apertures 160 are preferably horizontal slots as best shown in FIG. 6. Each aperture 160 is adapted to receive a respective fastener 122 of the first clamping member 110 such that the skirt 52 is thereby connected to the first clamping member 110. Alternatively, the upper portion 144 of the skirt 52 may include one or more connector members such as notches or cut-outs that are adapted to receive the clamping member 110 or 112. The upper portion 144 may also alternatively include one or more connector members that are adapted to interlock with the clamping member 110 or 112 such as through a male/female connection.

The lower portion 146 of the skirt 52 includes a generally planar inner wall 168 that extends between a generally linear bottom edge 170 and a generally linear top edge 172 that is generally parallel to the bottom edge 170. The lower portion 156 of the skirt 52 also includes a generally planar outer wall 174 having a generally linear bottom edge 176. The outer wall 174 of the lower portion 146 is generally coplanar with the outer wall 154 of the upper portion 144 and adjoins the outer wall 154 of the upper portion 144. The inner wall 168 of the lower portion 146 is spaced apart from, generally parallel to, and opposite the outer wall 174 of the lower portion 146. The lower portion 146 includes a generally planar inclined bottom wall 178 that extends between the bottom edges 170 and 176 of the inner wall 168 and outer wall 174. The bottom edge 170 of the inner wall 168 is located downwardly below the bottom edge 176 of the outer wall 174 such that the bottom wall 178 is inclined upwardly from the bottom edge 170 of the inner wall 168 to the bottom edge 176 of the outer wall 174. The bottom wall 178 is preferably inclined at approximately the same angle at which the side portions 22 of the conveyor belt 14 are inclined such that the bottom wall 178 is adapted to be located generally coplanar with the top surface 24 of the inclined side portions 22 of the conveyor belt 14. One preferred angle of inclination is approximately forty degrees, although other angles of inclination may be used. The skirt 52 also includes an inclined transition wall 182 that is generally planar and that extends inwardly and upwardly from the top edge 172 of the inner wall 168 of the lower portion 146 to the bottom edge 150 of the inner wall 148 of the upper portion 144. The top end of the lower portion 146 is integrally attached to the bottom end of the upper portion 144. The skirt 52 is preferably formed as a integral member from an elastomeric material such as styrene butadiene rubber (SBR rubber).

As best shown in FIG. 7, the upper portion 144 of the skirt 52 has a first thickness between the inner wall 148 and the outer wall 154, and the lower portion 146 has a second thickness between the inner wall 168 and the outer wall 174, wherein the second thickness of the lower portion 146 is thicker than the first thickness of the upper portion 144. For example, the upper portion 144 may have a thickness of approximately one-half inch and the lower portion 146 may have a thickness of approximately three-quarters of an inch. The thicker lower portion 146 comprises the majority of the overall volume of the skirt 52 to maximize the percentage volume of the sacrificial lower portion of the skirt 152, while minimizing the percentage volume of the upper portion of the skirt 152 that is used for attachment purposes only. The thicker lower portion 146 also provides increased resistance to bending of the skirt 52 than the thinner upper portion 144. The inner wall 148 of the upper portion 144 is offset horizontally and inwardly from the inner wall 168 of the lower portion 146 such that the lower portion 146 is thicker than the upper portion 144 and such that a recessed pocket 184 is formed in the upper portion 144 of the skirt 52. The pocket 184 is located adjacent the inner wall 148 of the upper portion 144. The pocket 184 extends from the top edge 152 of the inner wall 148 to the transition wall 182 and from the first end 140 to the second end 142 of the skirt 52.

The size of the gaps between the belt 14 and the side wall 22 and wear liner 32 may vary from one conveyor mechanism to another, often depending on the type of conveyed material, but are normally in the range of approximately one-half inch to one inch in size. Unless the skirt 52 has a thickness at least equal to the size of these gaps, there is the possibility that the skirt 52 can become caught in the gap causing premature failure of the skirt 52 or even preventing the conveyor mechanism 12 from running. Martin Engineering Company recommends a gap size of approximately one-half inch. The lower portion 146 of the skirt 52 preferably has a thickness equal to or greater than one-half inch, such as three-quarters of an inch. The pocket 184 in the upper portion 144 allows the thickness of the lower portion 146 to be thicker than the upper portion 144, and allows the size of the thickness of the lower portion 146 to be adjusted as desired without having to modify the mounting mechanism 50 that connects to the upper portion 144 of the skirt 52.

As best shown in FIG. 4, a fastener 122 of the first clamping member 110 respectively extends through each aperture 160 in the skirt 52 such that the mounting strip 114 is located within the pocket 184 of the skirt 52. The upper portion 144 of the skirt 52 is located between the mounting strip 114 of the first clamping member 110 and the second clamping member 112 such that the skirt 52 is loosely clamped between the first and second clamping members 110 and 112. The first and second clamping members 110 and 112 are each a mounting member for attaching the skirt 52 to the conveyor mechanism 12. The clamping members 110 and 112 provide lateral support to the upper portion 144 of the skirt 52 along substantially the entire length of the upper portion 144 from the first end 140 to the second end 142 of the skirt 52. The mounting strip 114 has a thickness such that the inner surface of the mounting strip 114 is located approximately coplanar with the inner wall 168 of the lower portion 146 of the skirt 52 when the outer surface of the mounting strip 114 is in abutting engagement with the inner wall 148 of the upper portion 144 of the skirt 52 such that the inner surface of the mounting strip 114 is located within the pocket 184. The inward offset of the inner wall 148 of the upper portion 144 from the inner wall 168 of the lower portion 146 of the skirt 52, which forms the pocket 184, allows the inner wall 168 of the lower portion 146 to be located generally parallel to and in abutting engagement with the strip member 56 of the mounting mechanism 50. The strip member 56 of the mounting member 54 provides lateral stability to the lower portion 146 of the skirt 52.

The skirt 52 is pivotally attached to the conveyor mechanism 12 by the mounting mechanism 50 for pivotal movement about the central axes 78 of the fasteners 70. As best shown in FIG. 3, the mounting mechanism 50 is attached to the outside surface of the side wall 28 of the chute 26 such that the bottom edge 62 of the mounting member 54 is located approximately one-half inch above the top surface 24 of the conveyor belt 14. The length of each arm 100 is sized such that when the arms 100 extend vertically, such as due to wear of the skirt 52 or if the skirt 52 is removed, the first and second mounting members 110 and 112 and the arms 100 will not come into contact with the conveyor belt 14.

As described in U. S. patent application Ser. No. 09/940,028, filed Aug. 27, 2001, of Martin Engineering Company, which is incorporated herein by reference, when the arms 100 are inclined downwardly and forwardly as shown in FIGS. 1 and 2, and the conveyor belt 14 is moving in the direction as shown by the arrow "X", the arms 100 will allow the skirt 52 to float upwardly and downwardly in engagement with the top surface 24 of the conveyor belt 14 thereby creating floating contact between the skirt 52 and the conveyor belt 14. When the lower portion 146 of the belt 14 is approximately three-quarters of an inch thick, and when the kinetic coefficient of friction between the skirt 52 and the belt 14 is approximately 1.0, the skirt 52 creates an additional average tension on the belt 14 of approximately three pounds per linear foot of the skirt 52 when the skirt 52 is in floating contact with the belt 14. If desired, the angle of inclination of the arms 100 can be reversed from that shown in FIG. 2 such that the arms 100 extend downwardly and rearwardly, whereupon the arms 100 will press the skirt 52 downwardly into engagement with the belt 14 such that the skirt 52 is in pressure contact with the top surface 24 of the conveyor belt 14.

As best shown in FIG. 3, due to the inclination of the side portion 22 of the conveyor belt 14 and the corresponding inclination of the bottom wall 178 of the skirt 52 that is in engagement with the side portion 22, the side portion 22 of the conveyor belt 14 forces the lower portion 146 of the skirt 52 horizontally toward the center of the conveyor belt 14. This horizontal centering force that is applied to the lower portion 146 of the skirt 52 is resisted by engagement of the inner wall 168 of the lower portion 146 of the skirt 52 with the strip member 56 of the mounting member 54. The bottom end of the lower portion 146 of the skirt 52 is wedged between the vertical strip member 56 of the mounting member 54 and the inclined side portion 22 of the conveyor belt 14, such that the lower portion 146 of the skirt 52 is laterally supported in a first horizontal direction toward the center line of the conveyor belt 14 by the strip member 56 of the mounting member 54, and in an opposite horizontal direction by the inclined side position 22 of the conveyor belt 14 to prevent lateral movement of the lower portion 146 of the skirt 52. As the lower portion 146 of the skirt 52 wears due to sliding engagement with the moving conveyor belt 14, the arms 100 permit the skirt 52 to pivot downwardly to maintain sliding engagement with the conveyor belt 14.

Removal of the retainer members 82 and 126 from the fasteners 70 and 122 allows the arms 100 to be removed from the mounting member 54 and from the first clamping member 110, and allows the second clamping member 112 to be removed from the first clamping member 110, such that the skirt 52 can be removed and replaced.

Various features of the invention have been particularly shown and described in connection with the illustrated embodiment of the invention, however, it must be understood that these particular arrangements merely illustrate, and that the invention is to be given its fullest interpretation within the terms of the appended claims.

What is claimed is:

1. A skirt adapted to be attached to a conveyor mechanism to retain conveyed material on a conveyor belt of the conveyor mechanism, said skirt including:

an upper portion including a generally planar first inner wall and a generally planar first outer wall, said first outer wall being located generally parallel to said first inner wall, said upper portion being formed from an elastomeric material; and a lower portion attached to said upper portion, said lower portion including a generally planar second inner wall and a generally planar second outer wall, said second outer wall being located generally parallel to said second inner wall, said first inner wall of said upper portion being generally parallel to and inwardly offset from said second inner wall of said lower portion, said lower portion being formed from an elastomeric material;

whereby said lower portion of said skirt is generally thicker than said upper portion of said skirt to provide increased resistance to bending of said lower portion when said skirt is retaining conveyed material on the conveyor belt.

2. The skirt of claim 1 wherein said second outer wall of said lower portion is generally coplanar with said first outer wall of said upper portion.

3. The skirt of claim 1 wherein said upper portion forms a pocket adjacent to said first inner wall of said upper portion, said pocket adapted to receive a mounting member.

4. The skirt of claim 1 wherein said lower portion includes an inclined bottom wall extending between said second inner wall and said second outer wall.

5. The skirt of claim 1 including an inclined transition wall extending between said first inner wall of said upper portion and said second inner wall of said lower portion.

6. The skirt of claim 1 wherein said upper portion includes one or more connector members.

7. The skirt of claim 6 wherein each said connector member comprises an aperture.

8. The skirt of claim 7 wherein each said aperture extends from said first inner wall to said first outer wall of said upper portion.

9. A skirt adapted to be attached to a conveyor mechanism to retain conveyed material on a conveyor belt of the conveyor mechanism, said skirt including:

an upper portion including a first inner wall and a first outer wall, said first inner wall being spaced apart from and located opposite to said first outer wall; and a lower portion attached to said upper portion, said lower portion including a second inner wall and a second outer wall, said second inner wall being spaced apart from and located opposite to said second outer wall, said first inner wall of said upper portion being inwardly offset from said second inner wall of said lower portion such that said first inner wall of said upper portion forms a pocket;

whereby said pocket is adapted to receive a mounting member for attaching said skirt to the conveyor mechanism.

10. The skirt of claim 9 wherein said upper portion includes one or more connector members.

11. The skirt of claim 10 wherein each said connector member comprises an aperture extending from said first outer wall to said first inner wall, each said aperture being in communication with said pocket.

12. A conveyor belt skirt assembly adapted to be attached to a conveyor mechanism to retain conveyed material on a conveyor belt of the conveyor mechanism, said conveyor belt skirt assembly including:

a skirt having an upper portion and a lower portion attached to said upper portion, said upper portion including a first inner wall and a first outer wall, said lower portion including a second inner wall and a second outer wall, said upper portion forming a pocket adjacent said first inner wall of said upper portion;

a first clamping member having an elongate mounting strip, said mounting strip including an inside surface and an outside surface, said mounting strip adapted to be located within said pocket of said skirt such that said outside surface of said mounting strip is located adjacent said first inner wall of said upper portion of said skirt, said first clamping member including one or more connecter members for attaching said skirt to said mounting strip, said first clamping member adapted to be attached to the conveyor mechanism.

13. The conveyor belt skirt assembly of claim 12 including a second clamping member, said second clamping member adapted to be located adjacent said first outer wall of said upper portion of said skirt such that said upper portion of said skirt is located between said mounting strip of said first mounting member and said second clamping member, said connector members adapted to attach said second clamping member to said mounting strip of said first clamping member.

14. The conveyor belt skirt assembly of claim 13 wherein each said connector member comprises a fastener.

15. The conveyor belt skirt assembly of claim 14 wherein each said fastener of said first clamping member includes a first end attached to said outside surface of said mounting strip, each said fastener including a central axis located generally perpendicular to said mounting strip.

16. The conveyor belt skirt assembly of claim 14 wherein each said fastener includes a first end and a second end, and a retainer member adapted to be removably attached to said second end of said fastener, whereby removal of said retainer members from said fasteners allows removal of said second clamping member from said first clamping member and removal of said skirt from said first clamping member.

17. The conveyor belt skirt assembly of claim 12 wherein said inside surface of said mounting strip of said first clamping member is adapted to be located within said pocket of said upper portion of said skirt.

18. The conveyor belt skirt assembly of claim 12 wherein said inside surface of said mounting strip of said first clamping member is adapted to be located approximately coplanar with said second inner surface of said lower portion of said skirt.

19. The conveyor belt skirt assembly of claim 12 including a mounting member, said mounting member including an elongate strip member, said strip member having a bottom edge adapted to be located above the conveyor belt, said mounting strip of said first clamping member adapted to be attached to said strip member of said mounting member, said inner wall of said lower portion of said skirt adapted to be located adjacent said strip member of said mounting member.

20. The conveyor belt skirt assembly of claim 19 wherein said mounting member includes one or more struts attached to said strip member of said mounting member, said first clamping member being attached to said struts.

21. A skirt adapted to be attached to a conveyor mechanism to retain conveyed material on a conveyor belt of the conveyor mechanism, said skirt including:
    an upper portion including a generally planar first inner wall and a generally planar first outer wall, said first outer wall being located generally parallel to said first inner wall; and
    a lower portion attached to said upper portion, said lower portion including a generally planar second inner wall and a generally planar second outer wall, said second outer wall being located generally parallel to said second inner wall, said first inner wall of said upper portion being generally parallel to and inwardly offset from said second inner wall of said lower portion, said second outer wall of said lower portion being generally coplanar with said first outer wall of said upper portion;
    whereby said lower portion of said skirt is generally thicker than said upper portion of said skirt to provide increased resistance to bending of said lower portion when said skirt is retaining conveyed material on the conveyor belt.

22. A skirt adapted to be attached to a conveyor mechanism to retain conveyed material on a conveyor belt of the conveyor mechanism, said skirt including:
    an upper portion including a generally planar first inner wall and a generally planar first outer wall, said first outer wall being located generally parallel to said first inner wall, said upper portion forming a pocket adapted to receive a mounting member; and
    a lower portion attached to said upper portion, said lower portion including a generally planar second inner wall and a generally planar second outer wall, said second outer wall being located generally parallel to said second inner wall, said first inner wall of said upper portion being generally parallel to and inwardly offset from said second inner wall of said lower portion;
    whereby said lower portion of said skirt is generally thicker than said upper portion of said skirt to provide increased resistance to bending of said lower portion when said skirt is retaining conveyed material on the conveyor belt.

23. A skirt adapted to be attached to a conveyor mechanism to retain conveyed material on a conveyor belt of the conveyor mechanism, said skirt including:
    an upper portion including a generally planar first inner wall and a generally planar first outer wall, said first outer wall being located generally parallel to said first inner wall;
    a lower portion attached to said upper portion, said lower portion including a generally planar second inner wall and a generally planar second outer wall, said second outer wall being located generally parallel to said second inner wall, said first inner wall of said upper portion being generally parallel to and inwardly offset from said second inner wall of said lower portion; and
    an inclined transition wall extending between said first inner wall of said upper portion and said second inner wall of said lower portion;
    whereby said lower portion of said skirt is generally thicker than said upper portion of said skirt to provide increased resistance to bending of said lower portion when said skirt is retaining conveyed material on the conveyor belt.

24. A skirt adapted to be attached to a conveyor mechanism to retain conveyed material on a conveyor belt of the conveyor mechanism, said skirt including:
    an upper portion including a generally planar first inner wall, a generally planar first outer wall, and one or more connector members, each said connector member comprising an aperture, said first outer wall being located generally parallel to said first inner wall; and
    a lower portion attached to said upper portion, said lower portion including a generally planar second inner wall and a generally planar second outer wall, said second outer wall being located generally parallel to said second inner wall, said first inner wall of said upper portion being generally parallel to and inwardly offset from said second inner wall of said lower portion;
    whereby said lower portion of said skirt is generally thicker than said upper portion of said skirt to provide increased resistance to bending of said lower portion when said skirt is retaining conveyed material on the conveyor belt.

* * * * *